UNITED STATES PATENT OFFICE.

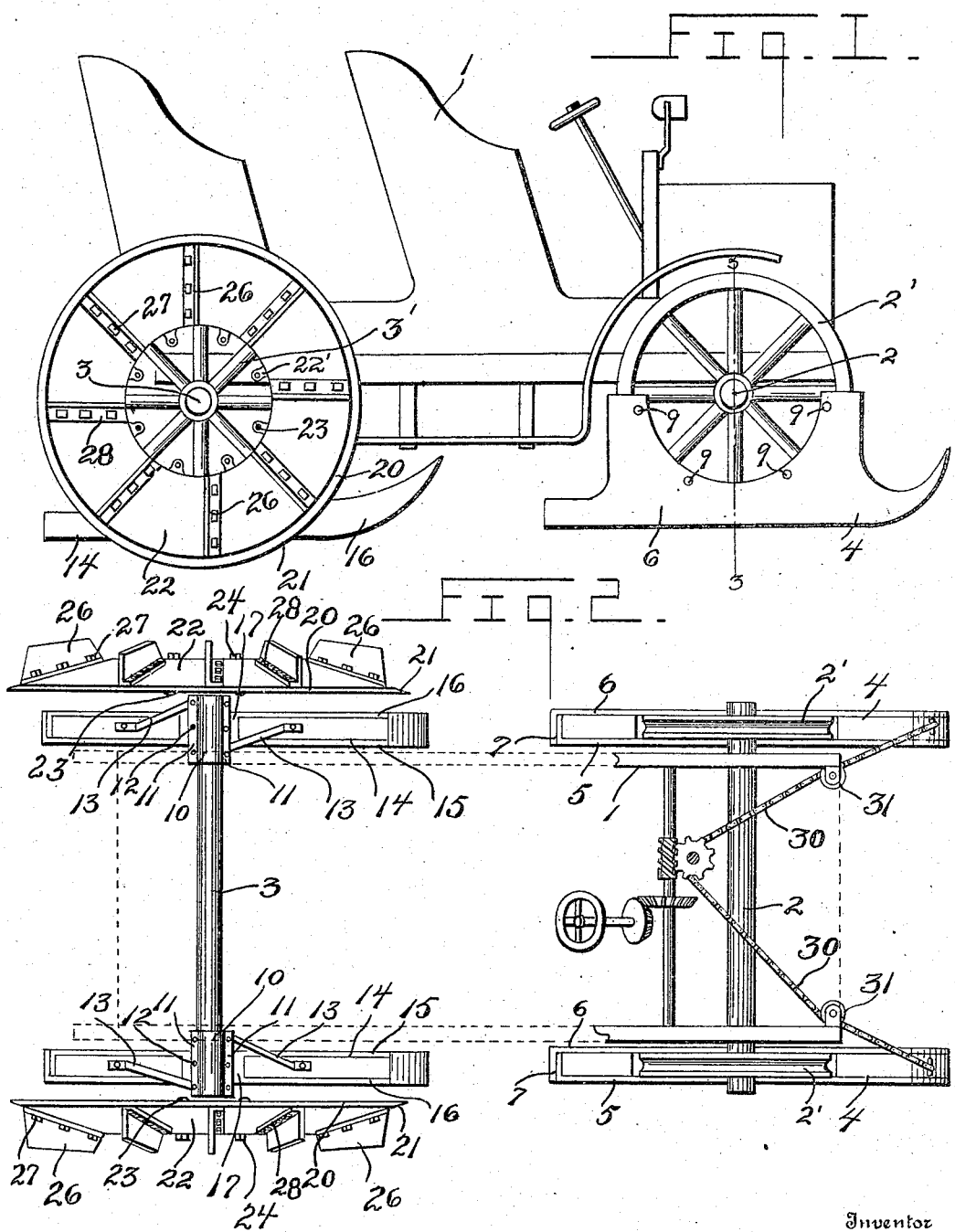

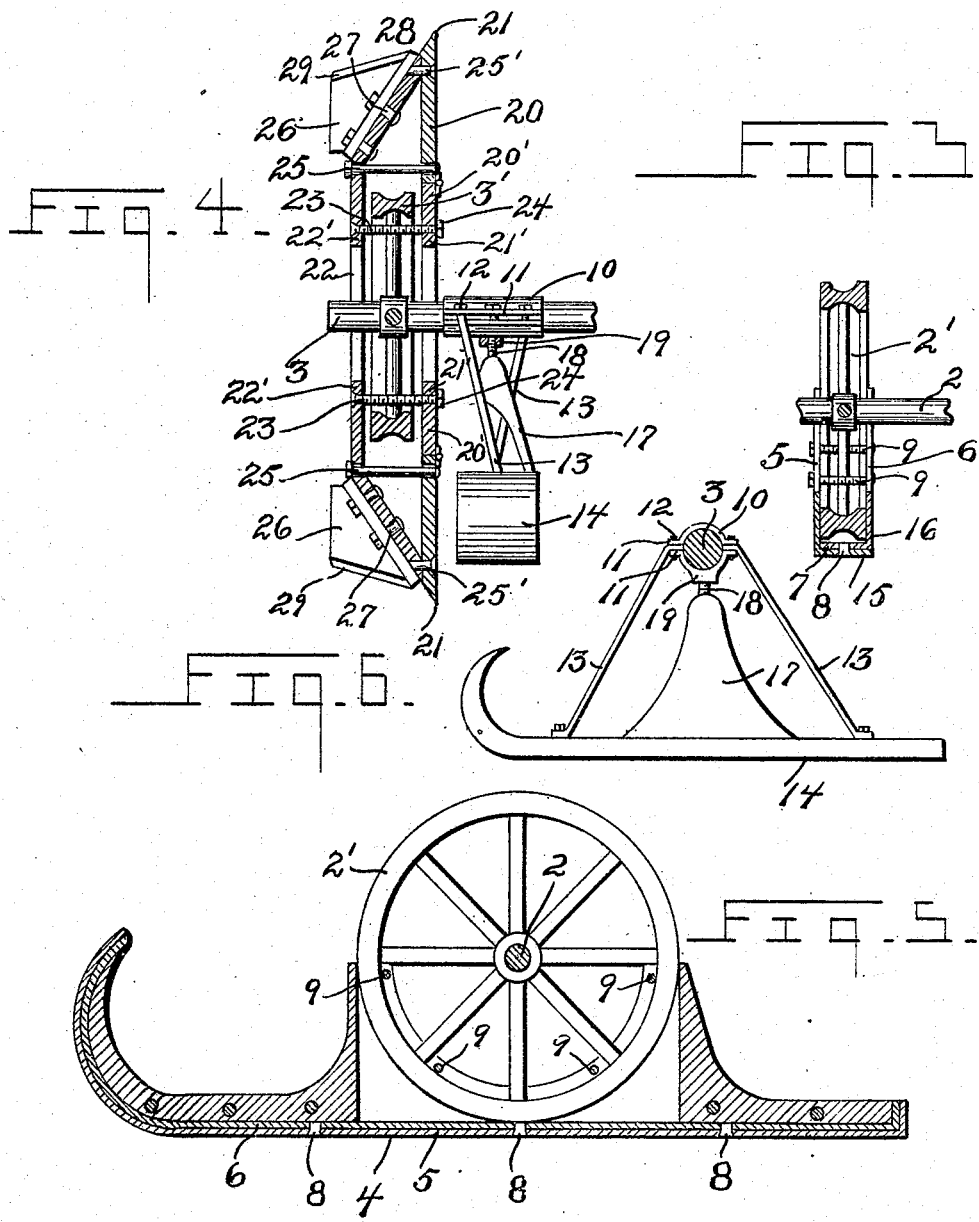

PEDER M. KNUTSON, OF CLIFFORD, NORTH DAKOTA, ASSIGNOR OF ONE-HALF TO HENRY KRAM, OF CLIFFORD, NORTH DAKOTA.

SLEIGH ATTACHMENT FOR AUTOMOBILES.

942,082.  Specification of Letters Patent.  Patented Dec. 7, 1909.

Application filed March 12, 1909. Serial No. 482,976.

*To all whom it may concern:*

Be it known that I, PEDER M. KNUTSON, a citizen of the United States, residing at Clifford, in the county of Traill and State of North Dakota, have invented certain new and useful Improvements in Sleigh Attachments for Automobiles, of which the following is a specification.

This invention relates to sleigh attachments for automobiles, and has for its object to provide an improved propelling means secured to the rear wheels of the vehicle after the tires have been removed.

Another object is to provide an improved construction of sleigh runner and means for bracing the same against lateral movement on the axle.

A further object is to provide vanes or blades secured to the propelling wheel, by means of which the movement of the vehicle through snow drifts will be facilitated.

With these and other objects in view, the present invention consists in the combination and arrangement of parts as will be hereinafter more fully described, and particularly pointed out in the appended claims, it being understood that changes in the specific structure shown and described may be made within the scope of the claims without departing from the spirit of the invention.

In the drawings forming a portion of this specification, and in which like numerals of reference indicate similar parts in the several views, Figure 1 is a side elevation of an automobile body provided with my improvements, Fig. 2 is a plan view, the body of the vehicle being removed, Fig. 3 is a transverse section on the line 3—3 of Fig. 1, Fig. 4 is an enlarged section through one of the rear wheels of the vehicle with my improved propelling means secured thereto, Fig. 5 is a detail section through the front runner showing the manner of attaching the same to the wheels of the vehicle. Fig. 6 is a side elevation of one of the rear runners and support therefor.

Referring to the drawings, 1 indicates an automobile body of any ordinary or approved construction and 2 and 3 the front and rear axles of the same.

2' indicates the front wheels of the vehicle to which are secured the runners 4. These runners comprise two spaced parallel plates 5 and 6 having their lower edges disposed at right angles in reverse directions as at 7, and secured together by means of the rivets 8. The wheels 2', the tires of which have been previously removed, are seated between the plates 5 and 6 and are secured therein by the bolts 9. The front ends of the plates are curved upwardly to present an ornamental appearance and the space between the same on either side of the periphery of the wheels is filled in by metal blocks, thereby greatly strengthening and adding to the rigidity of the runners.

The rear shaft 3 is provided near its ends with the sleeves or collars 10, each of which is formed in two sections and provided with the flanges 11 upon diametrically opposite sides of the shaft, and between which is secured by means of the bolts 12, the upper ends of stay or brace rods 13, the lower ends being secured to the rear runner 14. These runners comprise plates 15 and 16 secured together in a similar manner to those of the front runners. The inner plate 16 has formed integral therewith the standard 17, obliquely inclined and provided on its upper end with the screw threaded pin 18, adapted to be secured in a screw threaded socket 19 in the under side of the sleeve 10.

Upon the ends of the axle 3 are mounted the rear wheels 3' upon which, after the tires have been removed, are secured my improved propelling means which will now be described in detail. It comprises the circular concentrically disposed plate 20 arranged upon one side of the wheel and having its inner periphery provided with spaced hinged ears 20'. The outer periphery of this plate is beveled to provide a knife edge 21. Over the outer face of the wheel is a second plate 22 the greater portion of which extends obliquely inward and engages with the plate 20 near the outer edge thereof. These plates are secured in position by means of the bolts 23 which extend between the spokes of the wheel and connect the ears 20' and 22' provided upon the inner peripheries of the respective plates. The heads of the bolts are preferably countersunk in the plate 20 while the outer ends are provided with the usual nuts 24. In addition to this stay rods 25 also secure said plates beyond the outer periphery of the wheel rim, and rivets 25' securely connect the plates at their outer edges. Secured at intervals to the oblique portion of the plate 22 are the vanes or blades 26. These blades project outwardly at right angles to the face of the plate and are secured thereto by rivets 27. They form an irregular triangle in shape, one side being provided with a flange 28, through which the rivets 27 extend. The lower edge 29 of the blade is also formed with a knife edge, which acts in a certain degree to limit the movement of the plate 20 into the ground.

The usual steering gear and driving mechanism is provided, and it is believed requires no detailed description. To the lower end of the steering rod is attached the chains 30 which extend through guide rollers 31 secured on either side of the frame and have their front ends secured to the runners 4, thus turning the runners to the right or left as the steering wheel is turned by the operator.

From the foregoing description taken in connection with the accompanying drawings, the operation and many advantages of my invention will be readily understood. The knife edges provided upon the plate 20 and the blade 26 will firmly contact with the ground and force the runners, whose lower edges are some distance above the outer periphery of the plates, over the ground. The blade 26 will also materially assist in forcing the vehicle through deep snow drifts.

My invention is extremely simple, inexpensively constructed and very durable and efficient in use.

What is claimed is:—

1. The combination with a vehicle body, of a frame supporting said body, wheels mounted on axles at the front and rear of said frame, runners attached to the front wheels, runners secured to the rear axle, plates arranged on either side of the rear wheels, one of said plates being obliquely disposed beyond the periphery of the wheel, blades extending outwardly at right angles to the oblique portions of said plates and secured thereto, and means for securing said plates together, substantially as and for the purpose set forth.

2. The combination with a vehicle body, of a frame for supporting said body, wheels mounted on axles on the front and rear of said frame, runners attached to the front wheels, runners secured to the rear axle, plates arranged on either side of the rear wheels, one of said plates being obliquely disposed beyond the periphery of said wheels, blades arranged at intervals on said plates and extending outwardly at right angles to the oblique portion thereof, flanges formed on one edge of said blades, rivets extending through said flanges and the oblique portion of said plates, spaced ears upon the inner periphery of said plates, and bolts connecting said ears and securing said plates together substantially as and for the purpose set forth.

3. The combination with a vehicle body, of a frame for supporting said body, wheels mounted on axles at the front and rear of said frame, runners attached to the front wheels, sleeves upon said rear axle provided with oppositely disposed flanges, runners depending from said sleeves and having brace rods, the upper ends of said brace rods being secured between said flanges, concentrically disposed plates arranged on either side of the rear wheels, one of said plates being obliquely disposed beyond the periphery of said wheels, the other of said plates having a knife edge at the outer periphery thereof, blades arranged at intervals upon the oblique portions of said first mentioned plates and extending outwardly at right angles thereto, said blades being substantially triangular in form and having a flange upon one edge thereof, rivets for connecting said blades and plates together, ears formed upon the inner periphery of the outer plates, and ears hinged to the inner plates in alinement therewith, bolts for connecting said ears, and stay rods connecting said plates beyond the periphery of said wheels substantially as and for the purpose set forth.

4. The combination with a vehicle body, of a frame for supporting said body, wheels mounted on axles at the front and rear of said frame, plates arranged on either side of said front wheels having their lower edges disposed at right angles and extending in opposite directions, rivets for connecting the angled portions of said plates together, bolts extending between the spokes of said wheels and connecting the side plates, plates concentrically arranged on either side of the rear wheels, one of said plates being obliquely disposed beyond the periphery of said wheels, blades extending outwardly at right angles to the oblique portions of said plates, the lower edges of said blades being provided with a knife edge, a flange upon one edge of said blade and means for securing said plates and blades together, substantially as and for the purpose set forth.

In testimony whereof I affix my signature, in presence of two witnesses.

PEDER M. KNUTSON.

Witnesses:
 H. N. HANSON,
 H. N. KLEO.